Patented Sept. 1, 1953

2,650,910

UNITED STATES PATENT OFFICE 2,650,910

WATER-SOLUBLE UREA-ALDEHYDE CONDENSATION PRODUCTS AND THE PROCESS OF MAKING SAME

Franz Köhler, Alsbach (Bergstrasse), Germany, assignor to Deutsche Gold- und Silber-Scheideanstalt vormals Roessler, Frankfurt am Main, Germany, a corporation of Germany No Drawing. Application April 5, 1950, Serial No. 154,195. In Germany April 13, 1949

11 Claims. (Cl. 260—68)

1

The present invention relates to water-soluble urea-aldehyde condensation products and the process of making same.

It is an object of this invention to provide resinous compositions which are suitable for use as textile and paper sizing material.

It is a further object to provide resinous compositions which are suitable for use in the production of artificial leather.

It is also an object to provide resinous compositions suitable as adhesives cements and hardening agents.

Other objects and advantages will become apparent from the more detailed description of the invention. Such description should not be taken as limiting out only by way of illustration and explanation, since numerous variations may be made in the process of this invention by those skilled in the art without departing from the spirit and scope thereof.

Hitherto known publications concerning the condensation of urea with aldehydes always contain the observation that the properties of the reaction products are decisively influenced by the actual pH concentration.

In reacting urea with aldehydes in the presence of an alkaline pH water-soluble hardenable methylol carbamides are formed, whilst in the presence of an acid pH the insoluble and infusible methylene carbamides or their polymerization products are obtained.

These water-soluble reaction products of urea and formaldehyde which may be converted into hard resinous solids are widely used in resins and plastics and in various industries, whilst the insoluble and infusible methylated urea or its polymerization products are practically useless.

It has already been claimed and described that urea may also be reacted with aldehydes in the presence of acrolein and an acid pH whereby water-soluble, extremely stable condensation products are formed. In a modification of this method instead of acrolein or its alpha substitution compounds other aldehydes are used whereupon the subsequent condensation of urea with formaldehyde in an acid medium results in the desired valuable water-soluble compositions.

Now it has been found possible in a very simple manner to coreact urea and/or its C- or N-substitution products with aldehydes, preferably formaldehyde, in an acid pH whereby permanently stable water-soluble condensation products are formed which may also be converted into hard resinous solids and plastics.

The main object of the present invention comprising a new form of reaction between urea and aldehydes in the presence of acidic and catalytic substances may be represented by a reaction component with amino groups of the general formula I 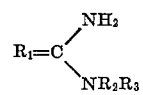

where $R_1$ is oxygen, sulphur or imin, $R_2$ and $R_3$ are hydrogen, alkyl, alkenyl, aryl, aralkyl, or acyl of saturated or unsaturated acids. At temperatures of 80 to 100° C. this reactive component will be subjected to a preliminary treatment with ammonia or its substitution compounds of the general formula II 

where $R_1$, $R_2$ and $R_3$ are hydrogen, alkyl, oxalkyl or hydroxyl respectively, whereupon the condensation is carried out with aldehydes, preferably formaldehyde. The ratio of these reaction components is 1 active amino hydrogen atom in 1 mole urea to 0.6 to 1.0 mole aldehyde. If desired, mixtures of compounds according to the Formulae I and II may also be used.

The preliminary treatment of urea and/or its C- and N-substitution compounds with the substances according to this invention is carried out in such a way that ammonia or its substitution compounds may be coreacted in catalytical amounts. The ratio preferably is 1 mole of the compound of general Formula I to 0.01 to 0.5 mole of the compound of general Formula II. Thereby the necessary lowest limit depends on the final proportion of reaction between the active amino hydrogen and the aldehyde: with constant available amino hydrogen the rate of ammonia increases with a decreasing amount of aldehyde. Whilst in the reaction of 1 mole urea to 4 moles formaldehyde a quantity of 0.015 mole ammonia is needed to start the described effect, 1 mole urea and 3 moles formaldehyde necessitate 0.03 mole of ammonia.

As amino group containing constituents of the present invention I may use, for instance, urea and its N-mono alkyl or aryl derivatives, thiourea and its derivatives, guanidine, further acryloyl urea or acryloyl thiourea and their alpha and/or beta derivatives and acylated urea or thiourea which substances may be coreacted either single or blended.

As catalysts I may use ammonia, alkyl amines, hydroxyl amine or alkylol amine such as monoethanolamine, diethanolamine or triethanolamine.

Now it has been found that the properties of the products of the present invention may be modified accordingly if besides formaldehyde also other saturated and/or unsaturated aldehydes, for instance, acrolein, alpha- and beta substituted acrolein, furfural, acetaldehyde, butyraldehyde and the like are used in the condensation process. Thus, for instance, it has been observed that in reacting acrolein in addition to formaldehyde products are formed which contrary to preparations made without acrolein may advantageously be used as textile or leather sizing agents. In this embodiment of the present invention the aldehydes used in addition to formaldehyde are not utilized as catalysts but as a reaction component. Good yields were, for instance, obtained with 0.25 to 2 moles, preferably 0.5 to 1 mole acrolein or any other suitable aldehyde to 1 mole of urea.

The condensation products according to the present invention are waterwhite or slightly cloudy, or in case of pure starting materials even completely colorless solutions containing a definite portion of a latent bound aldehyde. After evaporating of the water the condensation products yield transparent glues which may be cured with acid or acid reacting compounds. These new condensation products are not only miscible with water but also readily soluble in water. They show an excellent storage property.

The compositions according to the present invention may be used as water-repellent agents for materials made from regenerated cellulose hydrates. Further, they may be used to increase the creaseproofness of artificial silk and staple fibre; to provide wash and laundering fast water-repellent finishings; to form swell-fast pastings by dispersion; to increase the resistance to laundering of finishings on base of resinous emulsions; to increase the adhesive power and swell-fastness of dispersion films and products thereof. Further, the compositions made according to the present invention may be utilized for the tanning with resins; for the manufacture of artificial leather in connection with dispersions; to increase resistance to wet-tearing and scouring of paper. In addition thereto it is possible to use the products of the present invention as veneer glue and joiner's glue, either alone or in combination with resinous dispersions. The compositions are also able to increase the adhesive power of animal and vegetable glues. Hardening agents for varnishes and lacquers have been produced too.

The following examples are given to illustrate the process and product of the present invention. All proportions are in parts by weight.

*Example 1*

60 parts of urea, 10 parts of water and 1 part of conc. ammonia were heated together at a temperature of 80 to 90° C. over a period of 20 minutes, cooled down to 40° C. After standardizing the pH to 3 to 4 with, for instance, acetic acid, the mixture was reacted with 400 parts of a 30% formaldehyde at a temperature of 70 to 80° C. over a period of 20 to 30 minutes. After cooling down to a temperature of 25 to 35° C., the composition is neutralized with 7.4 parts of 5 n soda lye.

A waterwhite, stable, water-soluble resinous solution was secured which smelled of formaldehyde; no deposit. After evaporation a highly viscous, clear and very stable glue was obtained.

*Example 2*

76 parts of thiourea are mixed with 20 parts of water and 2 parts of conc. ammonia and heated at a temperature of 80 to 90° C. over a period of 20 to 30 minutes. 300 parts of a 30% formaldehyde were added at a temperature of about 30° C., pH adjusted to 3 to 4 and the composition reacted at a temperature of 70 to 80° C. over a period of 20 to 30 minutes. After cooling down to a temperature of 25° C. the mixture is neutralized with alkali.

The reaction product forms a clear easily water-soluble solution which remains stable even in an acid reaction. After evaporation the solution is cured, forming a viscous glue.

*Example 3*

30 parts of urea and 38 parts of thiourea were mixed with 50 parts of a 5% aqueous solution of methylamine, then heated at a temperature of 80 to 90° C. over a period of 20 minutes, 350 parts of a 30% formaldehyde added at a temperature of 30° to 40° C., the pH adjusted to 3 to 4 and the whole composition reacted at a temperature of 70° to 80° C. over a period of 20 to 30 minutes. After cooling down the mixture is neutralized. A colorless clear resinous solution was obtained showing the same qualities as the composition made up in the foregoing examples.

*Example 4*

60 parts of urea were mixed with 14 parts of water and 1.5 parts of conc. ammonia, heated at a temperature of 90 to 95° C. over a period of 20 minutes, cooled down to a temperature of 45 to 50° C. and after standardizing to a pH of 3 to 4, the mixture is slowly reacted with 28 parts of acroleine. The composition is then heated for a temperature of 70° to 80° C. over a period of 5 to 10 minutes, Thereafter 300 parts of a 30% formaldehyde were added at a temperature of 30 to 35° C., the mixture then heated to a temperature of 70° C. over a period of about 30 minutes, cooled down to a temperature of 20 to 25° C. and neutralized with soda lye.

A waterwhite, water-soluble, yellowish or slightly orange colored stable and deposit free resinous solution was obtained which smelled slightly of formaldehyde.

What I claim is:

1. A process in accordance with claim 9 in which the first step is carried out at a temperature between 80° and 100° C.

2. A process in accordance with claim 9 in which the condensation with the aldehyde is carried out in the presence of acetic acid.

3. A process in accordance with claim 9 in which said aldehyde reactant includes formaldehyde.

4. A process for the production of a water soluble urea aldehyde resinous product which comprises heating a mixture of urea, water and ammonia in a proportion of 0.015 to 0.03 moles of ammonia to 1 mole of urea at a temperature of 80° to 100° C., thereafter adding formaldehyde to the reaction product in a proportion of 2.4 to 4 moles of formaldehyde to 1 mole of the urea employed and condensing the reaction product with such formaldehyde, only at a pH below 7.

5. A process for the production of a water soluble urea aldehyde resinous product which comprises heating a mixture of urea, water and ammonia in a proportion of 0.015 to 0.03 moles of ammonia to 1 mole of urea at a temperature of 80° to 100° C. thereafter adding formaldehyde and acrolein to the reaction product in a proportion of 2.4 to 4 moles of formaldehyde and 0.25 to 2 moles of acrolein to one mole of the urea employed and condensing the reaction product with such aldehydes, only at a pH below 7.

6. A water soluble urea aldehyde resinous product obtained in accordance with the process of claim 9.

7. A water soluble urea aldehyde resinous product obtained in accordance with the process of claim 4.

8. A water soluble urea aldehyde resinous product obtained in accordance with the process of claim 5.

9. A process for the production of a water soluble urea-aldehyde resinous product which comprises heating at least one compound of the general formula

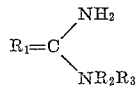

in which $R_1$ is selected from the group consisting of oxygen, sulfur and nitrogen, and $R_2$ and $R_3$ are selected from the group consisting of hydrogen, alkyl, alkenyl, aryl, acyl radicals of saturated acids and acyl radicals of unsaturated acids in the presence of water and an ammonia compound selected from the group consisting of ammonia and alkyl, oxalkyl and hydroxyl substituted ammonia in a proportion of 1 mole of the component of the above general formula to 0.01 to 0.5 mole of the ammonia compound, thereafter adding at least one aldehyde to the reaction product and condensing the reaction product with such aldehyde, only at a pH below 7.

10. A process for the production of a water soluble urea-aldehyde resinous product which comprises heating at least one compound of the general formula

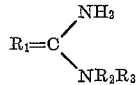

in which $R_1$ is selected from the group consisting of oxygen, sulfur and nitrogen, and $R_2$ and $R_3$ are selected from the group consisting of hydrogen, alkyl, alkenyl, aryl, acyl radicals of saturated acids and acyl radicals of unsaturated acids in the presence of water and an ammonia compound selected from the group consisting of ammonia and alkyl, oxalkyl and hydroxyl substituted ammonia in a proportion of 1 mole of the compound of the above general formula to 0.01 to 0.5 mole of the ammonia compound, thereafter adding formaldehyde and another aldehyde selected from the group consisting of acetaldehyde, butyraldehyde, acrolein and furfural to the reaction product, and condensing the reaction product with such aldehydes, only at a pH below 7.

11. A process for the production of a water soluble urea-aldehyde resinous product which comprises heating at least one compound of the general formula

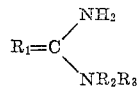

in which $R_1$ is selected from the group consisting of oxygen, sulfur and nitrogen, and $R_2$ and $R_3$ are selected from the group consisting of hydrogen, alkyl, alkenyl, aryl, acyl radicals of saturated acids and acyl radicals of unsaturated acids in the presence of water and an ammonia compound selected from the group consisting of ammonia and alkyl, oxalkyl and hydroxyl substituted ammonia in a proportion of 1 mole of the compound of the above general formula to 0.01 to 0.5 mole of the ammonia compound, thereafter adding an aldehyde to the reaction product in a proportion of 0.6 to 1.0 mole of aldehyde to 1 atom of active amino hydrogen in one mole of the urea component and condensing the reaction product with such aldehyde, only at a pH below 7.

FRANZ KÖHLER.

References Cited in the file of this patent

UNITED STATES PATENTS

| Number | Name | Date |
| --- | --- | --- |
| 2,277,480 | D'Alelio | Mar. 24, 1942 |
| 2,352,552 | Kienzle | June 27, 1944 |
| 2,554,475 | Suen | May 22, 1951 |

FOREIGN PATENTS

| Number | Country | Date |
| --- | --- | --- |
| 878,028 | France | Sept. 21, 1942 |